United States Patent
Lee et al.

(10) Patent No.: US 6,837,614 B2
(45) Date of Patent: Jan. 4, 2005

(54) HEAT-FLUX GAGE, MANUFACTURING METHOD AND MANUFACTURING DEVICE THEREOF

(75) Inventors: Yeol Hwa Lee, Daejeon (KR); Seong Wan Koo, Daejeon (KR); Jong Hak Choi, Daejeon (KR)

(73) Assignee: Agency For Defence Development, Daejeon (KR)

( * ) Notice: Subject to any disclaimer, the term of this patent is extended or adjusted under 35 U.S.C. 154(b) by 0 days.

(21) Appl. No.: 10/395,947

(22) Filed: Mar. 24, 2003

(65) Prior Publication Data

US 2003/0198276 A1 Oct. 23, 2003

(30) Foreign Application Priority Data

Apr. 19, 2002 (KR) ................................. 10-2002-0021693

(51) Int. Cl.⁷ ............................. G01N 17/00; G01K 1/16
(52) U.S. Cl. ............................ 374/25; 374/30; 374/208; 374/44; 73/204.11
(58) Field of Search ........................... 374/25, 30, 208, 374/44; 73/204.11

(56) References Cited

U.S. PATENT DOCUMENTS

| | | | | | |
|---|---|---|---|---|---|
| 2,769,334 A | * | 11/1956 | Soehngen | ................. | 374/43 |
| 3,648,516 A | * | 3/1972 | Paine | ..................... | 374/29 |
| 4,744,246 A | * | 5/1988 | Busta | .................. | 73/204.26 |
| 6,186,661 B1 | * | 2/2001 | Hevey et al. | ............... | 374/29 |
| 6,257,761 B1 | * | 7/2001 | Chuah et al. | ............... | 374/208 |
| 6,533,731 B2 | * | 3/2003 | Pottgen et al. | .............. | 600/549 |

FOREIGN PATENT DOCUMENTS

| | | | | |
|---|---|---|---|---|
| FR | 2706610 A1 | * | 12/1994 | .......... G01K/17/00 |
| JP | 60010134 A | * | 1/1985 | ............. G01J/5/02 |
| JP | 60249023 A | * | 12/1985 | .......... G01K/17/20 |

OTHER PUBLICATIONS

"Standard Test Method for Measuring Heat Flux Using a Copper–Constantan Circular Foil, Heat–Flux Gage", *American Society for Testing and Materials*, Designation: E511, pp. 1–6, Reapproved 1994.

* cited by examiner

Primary Examiner—Gail Verbitsky
(74) Attorney, Agent, or Firm—Scully, Scott, Murphy & Presser

(57) ABSTRACT

A heat-flux gage, a manufacturing method and a manufacturing device thereof which are improved from circular foil heat-flux gage disposed in ASTM E511 comprise: a cylindrical body having a receiving space therein, and a foil mounting hole on one end thereof; a foil including a heat absorption surface, an inner surface facing the heat absorption surface, and a radiant side surface connecting the heat absorption surface and the inner surface, wherein the inner surface faces toward the receiving space and the radiant side surface is contacted to a side surface of the foil mounting hole; a foil lead wire connected on a center of the inner surface of the foil; a body lead wire connected to an opposite end of the foil mounting hole on the cylindrical body; and a filler filled in the inner receiving space, to prevent the foil lead wire from being damaged by fixing the foil lead wire.

8 Claims, 3 Drawing Sheets

HEAT-FLUX GAGE, MANUFACTURING METHOD AND MANUFACTURING DEVICE THEREOF

BACKGROUND OF THE INVENTION

1. Field of the Invention

The present invention relates to a heat-flux gage, a manufacturing method thereof and a manufacturing device thereof, and particularly, to a heat-flux gage which is improved from a circular foil heat-flux gage disposed in ASTM (American Society for Testing and Material) E511, a manufacturing method and a manufacturing device thereof.

2. Description of the Background Art

When a temperature difference is generated between metals of difference kinds which are contacted to each other, an electromotive force (emf) is generated due to thermoelectric potential difference between the metals. And heat-flux gage means a sensor for calculating heat-flux amount by multiplying the electromotive force (emf) generated according to above principle by compensating value of heat-flux after mounting the above assembly of two kinds of metals on a heat source which will be measured.

FIG. 1 is a cross sectional view showing a construction and a principle of the heat-flux gage disposed on ASTM E511-73.

As shown therein, a general heat-flux gage has a structure that a circular foil 1 formed by a thermocouple constantan is coupled to a cylindrical body 2 formed by an oxygen-free high-conductivity copper (OFHC).

The heat-flux gage is to generate electromotive force (emf) of mV unit, which is a linear function of the heat-flux, and uses above material because nonlinear movement is shown in case that other metal compound is used.

Two thermocouple junctions are formed on the circular foil 1, one is a heat emission portion coupled to the cylindrical body 2, and the other is a junction with a lead wire 3 connected to a center part thereof.

The lead wire 3 is installed in order to transport a signal from the heat-flux gage to a readout device, and the lead wire 3 is fabricated by twisting a thin leading wire of copper material. The lead wire 3 is generally coated by TFE-fluorocarbon, and protected by a braid overwrap covered by the TFE-fluorocarbon. The lead wire is divided into anode and cathode by colors, and generally, black color is used for the cathode side.

The operation of the heat-flux gage is sensitively affected by surface status, and therefore, a coating by a thin layer of metallic or non-metallic material is generally formed on the surface of the heat-flux gage.

In case that radiant energy is measured, a high-emissive coating is used. It is ideal that the above coating has a diffuse absorbing surface. The diffuse coating is a coating not to change absorption rate by changing incident angle when radiating is generated on the coating.

Also, the ideal coating should have no change in the absorption rate according to the changes of wavelengths, and it is defined as "gray body". Some coatings approach to the ideal status, however, most coatings have differences from the ideal status.

A metallic coating having low emissivity formed by highly polished gold and nickel is used in a certain case which requires reflection of radiant heat, since the above coating reduces the sensitivity of the gage. The gold coating causes a phenomenon that the output of the heat-flux gage becomes non-linear shape due to rapid change on the thermal conductivity of the gold according to the temperature change.

Hereinafter, principles of measuring heat-flux by the heat-flux gage will be described as follows.

In case that the heat-flux gage is exposed to the heat source, the heat-flux absorbed by the circular foil 1 moves toward the cylindrical body 2 in radial direction, and difference of equilibrium temperature between the center portion of the circular foil 1 and the cylindrical body 2 is generated rapidly. An equilibrium thermoelectric potential (E) between the center portion of the circular foil 1 and the cylindrical body 2 is changed in proportion to heat-flux (q) absorbed into the foil as following equation.

$$Q=KE$$

Herein, K is a proportional factor set by an experimental result.

Therefore, in case that an appropriate K value is set through the experiment, emf generated on the circular foil 1 and the cylindrical body 2 respectively can be measured by the foil lead wire 3 and a body lead wire 4 to obtain the thermoelectric potential (E) value, and the heat-flux can be measured by above equation.

In order to measure precisely, the temperature should be in a range of 50~450° F. (−45~235° C.). In case that the temperature is out of above range, compensation by the change of physical property of the constantan foil is not made, and therefore, the gage does not show the linear movement due to the thermoelectric output any more.

In addition, an idea for fabricating the heat-flux gage has been required since the heat-flux gage should be fabricated very finely in order to obtain precise measured value using the heat-flux gage of above structure.

Especially, the junction of the circular foil 1 and the cylindrical body 2 makes the heat sink, and therefore, another material such as adhesive can not be added thereto. Therefore, the above components should be coupled in a force fit assembly. Thus, an idea for fabrication method of the heat-flux gage by which the above assembling process can be performed simply and finely has been desperately required.

Also, the foil lead wire 3 connected electrically to the circular foil 1 is in a structure that the lead wire is coupled on a plane, and therefore, coupling force therebetween is weak. Thus, a user should be careful when he/she uses the heat-flux gage.

SUMMARY OF THE INVENTION

To achieve the object of the present invention, as embodied and broadly described herein, there is provided a heat-flux gage comprising: a cylindrical body having a receiving space therein, and a foil mounting hole on one end thereof; a foil including a heat absorption surface, an inner surface facing the heat absorption surface, and a radiant side surface connecting the heat absorption surface and the inner surface, wherein the inner surface faces toward the receiving space and the radiant side surface contacts to a side surface of the foil mounting hole; a foil lead wire connected to a center of the inner surface of the foil; a body lead wire connected to opposite end of the foil mounting hole on the cylindrical body; and a filler filled in the inner receiving space.

Therefore, the foil lead wire is fixed firmly by the filler, and thereby, escape of the foil lead wire from the foil can be prevented.

Herein, it is desirable that the filler is ceramic material, because the heat-flux gage according to the present invention is used at high temperature and the ceramic material is strong for the heat.

Also, it is effective that the foil is formed as a circular plate. When the foil is formed as a circle, it is easy to analyze a result since the shape of the foil is formed as symmetric.

To achieve the object of the present invention, there is provided a method for fabricating a heat-flux gage comprising: a step of disposing a cylindrical body having a receiving space therein, and a foil mounting hole on one end thereof; a step of disposing a foil including a heat absorption surface, an inner surface facing the heat absorption surface, and a radiant side surface connecting the heat absorption surface and the inner surface; a foil welding step for point welding a foil lead wire on a center of inner surface of the foil; a body welding step for point welding a body lead wire on an opposite end of an end on which the foil mounting hole is formed; a assembly fixture inserting step for inserting an assembly fixture having a foil lead wire hole therein into the receiving space of the cylindrical body; and a foil assembly step for inserting the foil lead wire through the foil lead wire hole of the assembly fixture and for assembling the circular foil into the foil mounting hole in a force fitting method.

Therefore, the foil lead wire is protected by the assembly fixture, and thereby, damages of the foil lead wire or of the coupling portion of the foil lead wire and the inner surface during the force fitting process can be prevented.

Also, it is desirable that the above method further comprises: a step of separating the assembly fixture from the receiving space of the cylindrical body; and a filing step for filling a filler in the receiving space of the cylindrical body, after the foil assembly step.

In addition, the filling step is to fill the filler of ceramic material, and it is desirable that the method further comprises a heating and hardening step for heating the heat-flux gage assembly consisting of the foil and the cylindrical body after the filling step.

Also, it is desirable that the method further comprises a cutting step for micro-cutting the front surface of the heat-flux gage assembly after the heating and hardening step.

In addition, it is desirable that the method further comprises a acid cleaning step for cleaning the surface of the heat-flux gage assembly with acid; and a washing step for washing the surface of the acid-cleaned heat-flux gage assembly, after the cutting step.

Further, it is effective that the method further comprises a coating step for forming a non-reflective coating film on an exposed surface of the circular foil, after the washing step.

On the other hand, to achieve the object of the present invention, there is provided an assembly fixture comprising: a support portion; a protruded portion which is protruded from the support portion to be inserted into the receiving space of the cylindrical body; and a lead wire hole formed on center portion in the protruded portion so that a foil lead wire can be penetrated therethrough.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings:

FIG. 3 is a longitudinal cross sectional view illustrating foil welding step;

FIG. 4 is a longitudinal cross-sectional view illustrating body welding step;

FIG. 5 is a longitudinal cross-sectional view illustrating assembly fixture mounting process and foil assembly step;

FIG. 6 is a longitudinal cross-sectional view illustrating filling step; and

DETAILED DESCRIPTION OF THE PREFERRED EMBODIMENTS

Reference will now be made in detail to the preferred embodiments of the present invention, examples of which are illustrated in the accompanying drawings.

Figure 1:
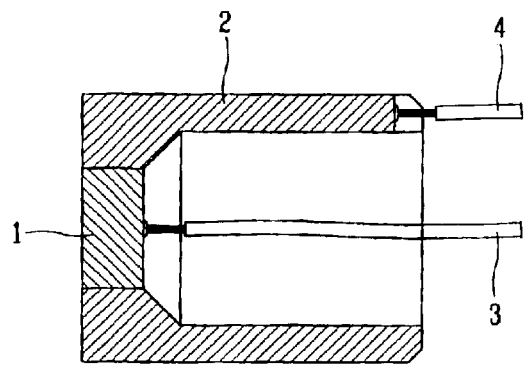
FIG. 1 is a cross-sectional view showing a structure and a principle of a conventional heat-flux gage.
Figure 2:
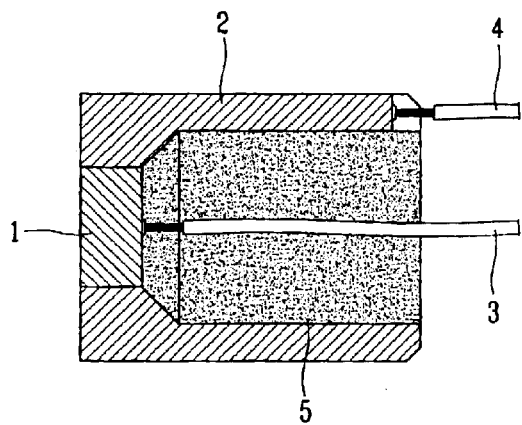
FIG. 2 is a longitudinal cross-sectional view showing a structure of a heat-flux gage according to the present invention.
Figure 3:
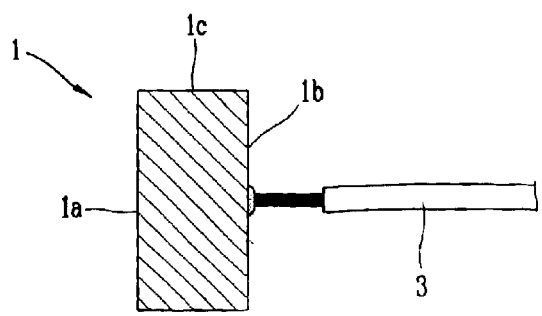
FIG. 3 through FIG. 6 are showing manufacturing processes of the heat-flux gage according to the present invention.
Figure 4:
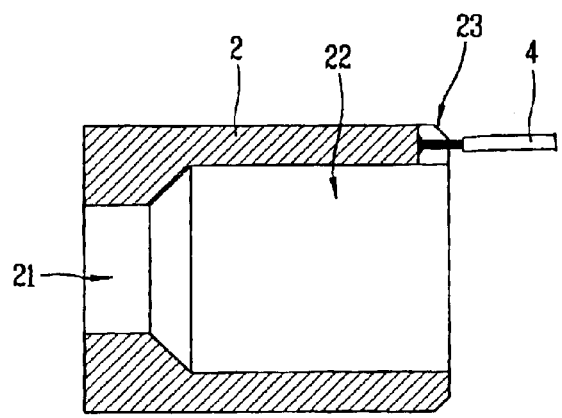
Figure 5:
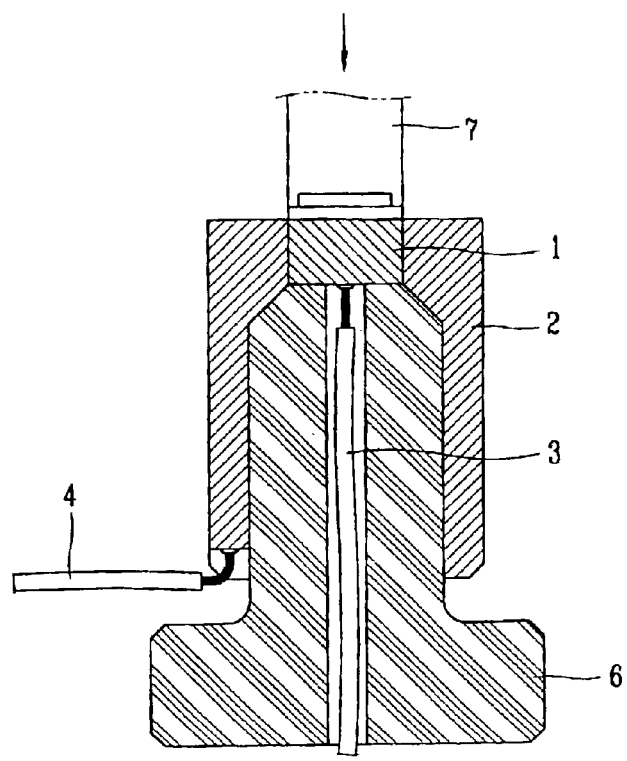
Figure 6:
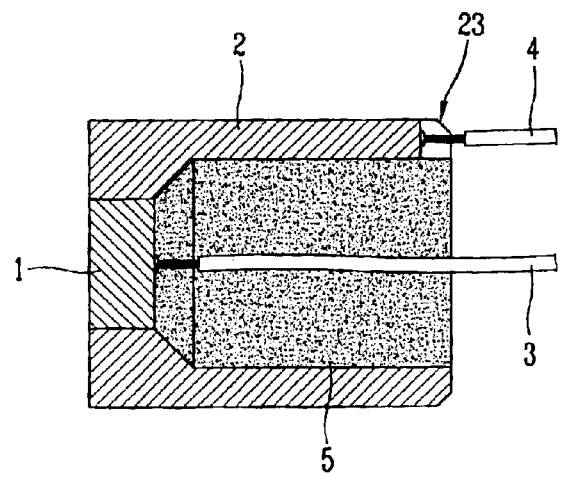
Figure 7:
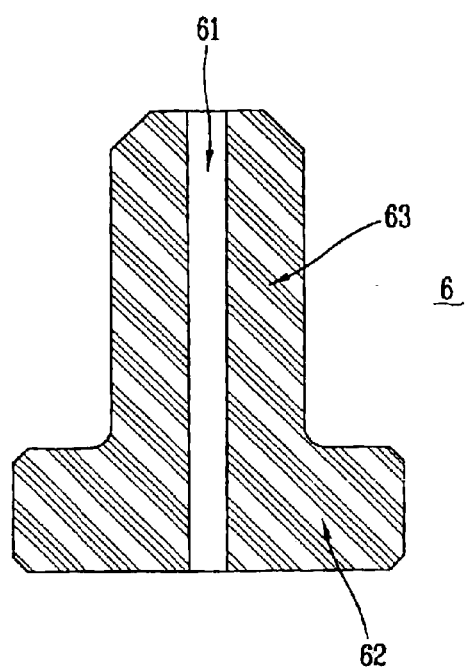
FIG. 7 is a longitudinal cross-sectional view showing a structure of the assembly fixture of the heat-flux gage according to the present invention.

FIG. 2 is a longitudinal cross-sectional view showing a structure of a heat-flux gage according to the present invention, FIG. 3 through FIG. 6 are views showing manufacturing process of the heat-flux gage according to the present invention, FIG. 3 through FIG. 6 are showing manufacturing processes of the heat-flux gage according to the present invention, wherein FIG. 3 is a longitudinal cross sectional view illustrating foil welding step; FIG. 4 is a longitudinal cross-sectional view illustrating body welding step; FIG. 5 is a longitudinal cross-sectional view illustrating assembly fixture mounting step and foil assembly step; FIG. 6 is a longitudinal cross-sectional view illustrating filling step; and FIG. 7 is a longitudinal cross-sectional view showing a structure of the assembly fixture of the heat-flux gage according to the present invention.

As shown therein, the heat-flux gage according to the present invention comprises: a cylindrical body 2 having a receiving space 22 therein and a foil mounting hole 21 on one end thereof; a foil 1 mounted on the cylindrical body 2; a foil lead wire 3 connected to the foil 1; a body lead wire 4 connected to the cylindrical body 2; and a filler 5 filled in the inner receiving space 22.

The cylindrical body 1 is formed as a cylinder, and comprises the receiving space 22 formed therein, the foil mounting hole 21 formed on one side thereof, and a lead wire coupling portion 23 formed by cutting some part of the opposite end of the foil mounting hole 21.

The foil 1 is formed as a circular plate, and comprises a heat absorption surface 1a, an inner surface 1b facing the heat absorption surface 1a; and a radiant side surface 1c connecting the heat absorption surface 1a and the inner surface 1b. Also, the inner surface 1b of the foil 1 faces toward the receiving space 22, and the radiant side surface 1c is coupled to be contacted with a side surface of the foil mounting hole 21.

The foil lead wire 3 is connected to a center of the inner surface 1b of the foil, and the body lead wire 4 is connected to the lead wire coupling portion 23 of the cylindrical body 1.

The filler 5 is made with ceramic material which is resistant for the heat, since the heat-flux gage according to the present invention is used at high temperature status.

In the present invention, the inner receiving space 22 of the cylindrical body 2 is filled with the filler 5.

That is, the foil lead wire 3 is electrically connected to the inner surface 1b of the circular foil 1, and after that, the filler is filled around the lead wire 3, and therefore, the foil lead wire 3 firmly coupled to the foil and can not be escaped from the circular foil 1.

On the other hand, a manufacturing method for the heat-flux gage according to the present invention comprises: a foil welding step for point welding the foil lead wire 3 on the inner surface 1b of the circular foil 1 (FIG. 3); a body welding step for point welding the body lead wire 4 on the lead wire coupling portion 23 of the cylindrical body 2, on which the mounting portion 21 of the circular foil is mounted, having the receiving space 22 therein (FIG. 4); an assembly fixture 6 inserting step for inserting an assembly fixture 6 having a foil lead wire hole 61 formed on center portion thereof into the receiving space 22 of the cylindrical body (FIG. 5); and a foil assembling step for inserting the foil lead wire 3 through the foil lead wire hole 61 of the assembly fixture and assembling the circular foil 1 into the mounting portion 21 of the cylindrical body in force fitting method.

As shown in FIG. 7, the assembly fixture 6 comprises: a support portion 62; a protruded portion 63 protruded from the support portion 62 to be inserted into the receiving space of the cylindrical body 2; and a lead wire hole 61 formed on the center portion of the protruded portion 63 so that the lead wire 3 of the circular foil 1 penetrates therethrough.

The manufacturing method according to the present invention is characterized in using the assembly fixture 6 having the foil lead wire hole 61 formed on center portion in the process of force fitting the circular foil 1, on which the foil lead wire 3 is point welded, into the cylindrical body 2.

Therefore, the assembly fixture 6 of above structure is inserted into the inner receiving space 22 of the cylindrical body 2, and the circular foil 1 can be assembled into the foil mounting portion 1 of the cylindrical body 2 in force fitting method using a punch 7, etc., and therefore, the assembly can be made precisely without damaging the foil lead wire 3.

The radiant side surface 1c of the circular foil 1 and the junction of the cylindrical body 2 make a heat sink, and therefore, another material such as the adhesive can not be added thereto. Thus, the above components should be assembled in the force fitting method, and the above process can be made easily and precisely according to the present invention.

After the circular foil 1 is assembled into the cylindrical body 2 in the force fitting method, the assembly fixture 6 is separated from the receiving space 22 of the cylindrical body 2, and then, the filler 5 is filled in the receiving space of the cylindrical body 2.

Herein, it is desirable that the filler 5 is made with ceramic material having heat resistance. Then, the filler of ceramic material is filled in the receiving space of the cylindrical body 2, and after that, the heat-flux gage assembly consisting of the circular foil 1 and the cylindrical body 2 is heated in order to harden the filler.

It is desirable that the heat-flux gage assembly is heated one or more hours at 150° C. in an oven, in order to harden the assembly.

After cooling the gage assembly, the front surface of the heat-flux gage assembly on which the circular foil 1 is mounted is micro-cut. The precise surface treatment greatly affects to the functions of the heat-flux gage.

The surface of the heat-flux gage is likely to have blots as undergoing above processes, and therefore, the surface of the heat-flux gage assembly is cleaned by acid and washed to maintain the inherent surface status of metal.

Any cleaner can be used if it is used for maintaining the surface status of metal, and the cleaning is made sufficiently until the original color of the metal is shown, and then, the heat-flux gage assembly is washed with flowing water, and dried.

In order to measure the heat-flux precisely, the heat-flux should not be reflected on the surface of the circular foil. Therefore, in order to prevent the reflection, non-reflective coating film is formed on the exposed surface of the circular foil.

As described above, according to the present invention, the filler is filled in the inner receiving space to fix the foil lead wire firmly, and therefore, the foil lead wire is not escaped from the inner surface of the foil easily.

Also, the assembly fixture is used when the foil is assembled in the force fitting method, and therefore, the assembling process can be performed precisely without damaging the foil lead wire.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalence of such metes and bounds are therefore intended to be embraced by the appended claims.

What is claimed is:

1. A manufacturing method of a heat-flux gage comprising:
   a step of disposing a cylindrical body having a receiving space therein, and a foil mounting hole on one end thereof;
   a step of disposing a foil including a heat absorption surface, an inner surface facing the heat absorption surface, and a radiant side surface connecting the heat absorption surface and the inner surface;
   a foil welding step for point welding a foil lead wire on a center of inner surface of the foil;
   a body welding step for point welding a body lead wire on an opposite end of an end on which the foil mounting hole is formed;
   a assembly fixture inserting step for inserting an assembly fixture having a foil lead wire hole therein into the receiving space of the cylindrical body; and
   a foil assembly step for inserting the foil lead wire through the foil lead wire hole of the assembly fixture and for assembling the circular foil into the foil mounting hole in a force fitting method.

2. The method of claim 1 further comprising;
   a step of separating the assembly fixture from the receiving space of the cylindrical body; and a filling step for filling a filter in the receiving space of the cylindrical body, after the foil assembly step.

3. The method of claim 2 wherein the filling step is a process or filling a filter of ceramic material.

4. The method of claim 3 further comprising:

a heating and hardening step for healing the heat-flux gage assembly consisting of the foil and the cylindrical body after the filling step.

5. The method of claim 4 further comprising:

a cutting step for micro-cutting an front surface of the heat-flux gage assembly after the heating and hardening step.

6. The method of claim 5 further comprising:

a acid cleaning step for cleaning the surface of the heat-flux gage assembly with acid; and a washing step for washing the surface of the acid-cleaned heat-flux gage assembly, after the cutting step.

7. The method of claim 6 further comprising:

a coating step forming a non-reflective coating film on an exposed surface of the circular foil, after the washing step.

8. An assembly fixture, which is used in the manufacturing method for the heat-flux gage according to one of claims 1 through 7, comprising:

a support portion;

a protruded portion which is protruded from the support portion to be inserted into the receiving space of the cylindrical body; and a lead wire hole formed on center portion in the protruded portion so that a foil lead wire can be penetrated therethrough.

* * * * *